US009304920B2

(12) United States Patent
Munoz

(10) Patent No.: US 9,304,920 B2
(45) Date of Patent: Apr. 5, 2016

(54) SYSTEM AND METHOD FOR PROVIDING CACHE-AWARE LIGHTWEIGHT PRODUCER CONSUMER QUEUES

(71) Applicant: LSI Corporation, San Jose, CA (US)

(72) Inventor: Robert J. Munoz, Round Rock, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 276 days.

(21) Appl. No.: 13/908,072

(22) Filed: Jun. 3, 2013

(65) Prior Publication Data

US 2014/0351519 A1 Nov. 27, 2014

Related U.S. Application Data

(60) Provisional application No. 61/826,549, filed on May 23, 2013.

(51) Int. Cl.
 G06F 12/08 (2006.01)
(52) U.S. Cl.
 CPC .......... G06F 12/0811 (2013.01); G06F 12/084 (2013.01)

(58) Field of Classification Search
 CPC ............ G06F 12/0811; G06F 12/0897; G06F 12/0084; G06F 2212/283
 USPC .......................................... 711/119–122, 130
 See application file for complete search history.

(56) References Cited

U.S. PATENT DOCUMENTS 8,751,737 B2 * 6/2014 Bu et al. ........................ 711/110

OTHER PUBLICATIONS

Massimo Torquati; Single-Producer/Single-Consumer Queues on Shared Cache Multi-Core Systems; Nov. 30, 2010; University of Pisa, Italy.

* cited by examiner

*Primary Examiner* — Jasmine Song

(57) ABSTRACT

A multiprocessor system or a system of hardware accelerators is provided to reduce cache ping-ponging and to provide improved single producer single consumer (SPSC) queues and methods. The systems are configured for specifying separate cache attributes for inner (e.g., local) cache and outer (e.g., shared) cache for promoting lower system overhead. Separate cache attributes are specified such that shared variables are cacheable only in a cache level shared by multiple processors.

20 Claims, 3 Drawing Sheets

SYSTEM AND METHOD FOR PROVIDING CACHE-AWARE LIGHTWEIGHT PRODUCER CONSUMER QUEUES

CROSS-REFERENCE TO RELATED APPLICATIONS

This application claims priority to U.S. Provisional Application No. 61/826,549 filed on May 23, 2013, entitled: "A System and Method for Providing Cache-Aware Lightweight Producer Consumer Queues", which is hereby incorporated by reference in its entirety.

FIELD OF THE INVENTION

The present disclosure relates to the field of distributed processing systems and particularly to a system and method for providing cache-aware lightweight producer consumer queues.

BACKGROUND

Single producer, single consumer queues are widely applicable as a building block for many systems which employ multiple cooperating processors. In such systems, cache ping-ponging often occurs. A number of techniques are currently implemented in an effort to minimize cache ping-ponging in such systems.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for providing cache-aware lightweight producer consumer queues.

BRIEF DESCRIPTION OF THE FIGURES

The detailed description is described with reference to the accompanying figures.

WRITTEN DESCRIPTION

Embodiments of the invention will become apparent with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
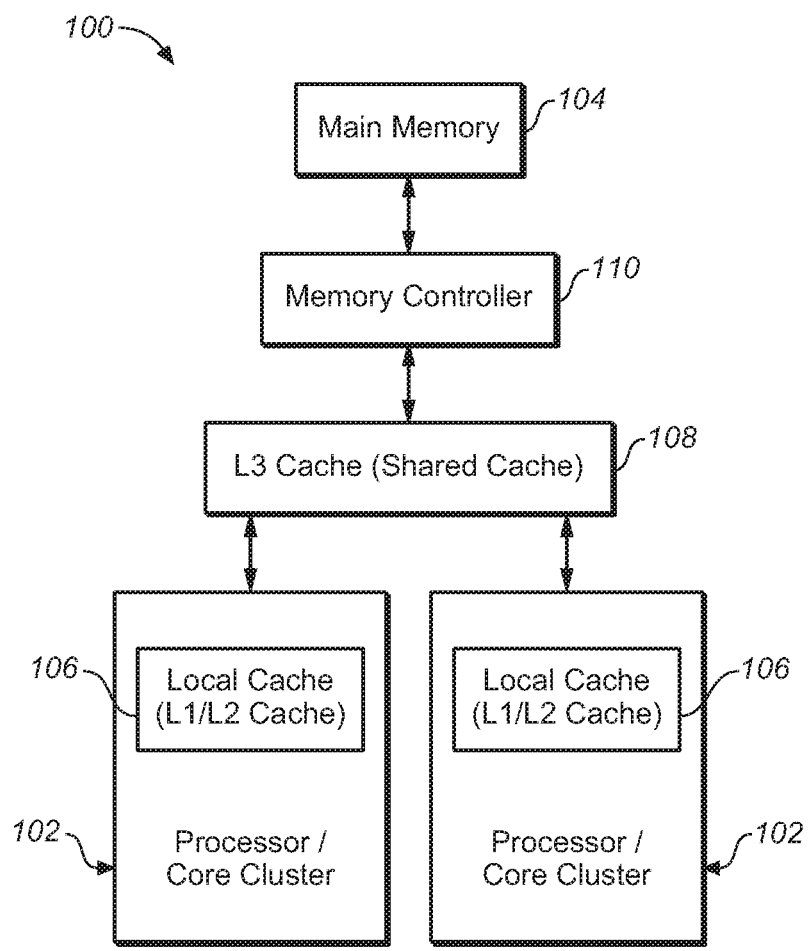
FIG. 1 is an example conceptual block diagram schematic of a system in accordance with an exemplary embodiment of the present disclosure.

Referring to FIG. 1, a system 100 is shown. In embodiments, the system 100 is a computer system. In embodiments, the system 100 is a distributed processing system (e.g., multiprocessing system). In embodiments, the system 100 is a symmetric multiprocessing (SMP) system. In other embodiments, the system 100 is an asymmetric multiprocessing (AMP) system. In embodiments, the system 100 includes two or more processors (e.g., processor cores, core clusters, central processing units (CPUs)) 102. In embodiments, processing for the system 100 is distributed across the processors 102, such that the processors 102 are cooperating processors. In embodiments, the processors 102 are communicatively coupled with each other (e.g., exchange information with each other). In embodiments, the processors 102 are hardware within the computer system 100 that carry out the instructions of a computer program by performing the basic arithmetical, logical and input/output operations of the computer system 100. In other embodiments, one or both of the processors 102 described above are specialized hardware accelerators (e.g., an engine that processes statistics and/or counter update requests from other engines or other processors) that provide services to the processors 102 or other parts (e.g., other components) of the system 100.

In embodiments, the system 100 includes a memory (e.g., main memory) 104. In embodiments, the processors 102 are connected to the main memory 104. In embodiments, the main memory 104 is shared memory, such that each of the processors 102 are configured for accessing the main memory 104. In embodiments, the shared memory 104 is a block of random access memory (RAM) (e.g., dynamic random access memory (DRAM)) that is configured for being accessed by the processors 102 of the system 100. In embodiments, the processors 102 are controlled by a single operating system (e.g., a single operating system instance). In embodiments, the main memory 104 is configured for operating under a single operating system. In embodiments, the operating system is a collection of software that manages hardware resources of the system 100 and provides services for computer programs of the system 100.

In embodiments, the processors 102 are configured for running independently of one another, each processor configured for executing different programs and working on different data and with the capability of sharing common resources (e.g., memory). In embodiments, the processors 102 are connected to each other, such as via system buses, crossbar switches, or on-chip mesh networks. In embodiments, each processor 102 has an associated private high-speed memory (e.g., cache memory, cache, local cache, CPU cache) 106 for speeding up access to speed up main memory data access and to reduce system bus traffic. In embodiments, the local cache 106 (e.g., CPU cache) is used by the processor 102 (e.g., CPU) to reduce the average time to access memory. In embodiments, the cache 106 is smaller, faster memory which stores copies of data from the most frequently used locations of the main memory 104. In embodiments, local cache 106 (e.g., inner cache) includes Level 1 (L1) cache and Level 2 (L2) cache. In further embodiments, the system 100 includes shared cache 108, which is configured for being shared by the processors 102. In embodiments, shared cache 108 (e.g., outer cache) includes Level 3 (L3) cache. In embodiments, L1 and L2 cache are faster than L3 cache.

In embodiments, the system 100 is configured for allowing any of the processors 102 to work on any task no matter where the data for that task are located in memory, provided that each task in the system is not in execution on two or more processors at the same time. In some embodiments, with proper operating system support, the system 100 is configured for moving tasks between processors 102 to balance the workload efficiently. In embodiments, the system 100 is configured for implementing software for multi-threaded (multi-tasked) processing.

In embodiments, the system 100 includes a memory controller 110. In embodiments, the memory controller 110 is connected between main memory 104 and the processors 102. In embodiments, the memory controller 110 is a digital circuit which manages the flow of data going to and from the main memory 104.

In embodiments, the system 100 is configured for implementing single producer, single consumer (SPSC) queues (e.g., buffers, queue buffers, queue data) as building blocks for the multiprocessing system. In embodiments, the SPSC queue is a data structure which is implemented via a first-in first-out (FIFO) buffer or circular buffer. In embodiments, the SPSC queue is stored in memory of the system 100 and includes data, the data configured for being read from or written to the SPSC queue. In embodiments, a producer is a process (e.g., an instance of a computer program being executed) or a thread (e.g., software program instructions which can execute in parallel with other threads) executing on one of the processors 102 or the equivalent functionality being executed in a specialized hardware accelerator. The producer is configured for producing an item (e.g., a task or set of program instructions, a buffer entry, a memory pointer, a variable, an element) and placing the item into the buffer (e.g., SPSC queue). In embodiments, a consumer is a process or thread executing on one of the processors 102 or the equivalent functionality being executed in a specialized hardware accelerator. The consumer and producer share access to the SPSC queue, the consumer being configured for consuming (e.g., removing) items from the buffer (e.g., SPSC queue). In embodiments, the consumer and producer are concurrent entities executing in parallel on separate processors or in equivalent hardware accelerators. In embodiments in which a hardware accelerator is used in place of a processor, a processor typically serves as the producer and a specialized hardware accelerator serves as the consumer.

In embodiments, the system 100, via its software and/or its underlying hardware facilities (e.g., via a memory management unit (MMU)) is configured for controlling allocation and/or behavior of its caches (106, 108). For example, software of the system 100 and/or underlying hardware facilities of the system 100 are implemented for specifying differential cache treatment. In embodiments, separate (e.g., proper) cache attributes are specified (e.g., set) for inner (e.g., local) caches 106 and outer (e.g., shared) cache 108. In embodiments, for a processor 102 upon which a producer is executing (e.g., the producing processor), the separate cache attributes are specified such that the queue buffer (e.g., SPSC queue) and the control variables that the producer writes to signal to the consumer (e.g., shared variables) are allocable/cacheable in the shared (e.g., L3) cache 108, and are not cacheable in the local cache 106 of the producing processor 102. In embodiments, the system 100 is configured for writing to the copy of the queue buffer allocated in the shared (e.g., L3) cache 108. In embodiments, for a processor 102 upon which a consumer is executing (e.g., the consuming processor), the separate cache attributes are specified such that the queue buffer (e.g., SPSC queue) may or may not be cacheable/allocable in the local cache 106 of the consuming processor, but is allocable/cacheable in the shared (e.g., L3) cache 108. Further, for the consuming processor, the control variables that the consumer writes to signal to the producer (e.g., shared variables) are allocable/cacheable in the shared (e.g., L3) cache 108 and are not cacheable in the local cache 106 of the consuming processor 102. In embodiments, the processor local variables (e.g., p_local_xxx variables) are local to each processor and/or thread (i.e., are not shared/visible across processors and/or threads) and are configured (e.g., via the MMU) to be cacheable/allocable in local (e.g., Level 1 (L1) or Level 2 (L2)) cache 106. As mentioned above, the shared variables (e.g., shared_write) are set up (e.g., via the MMU) such that variables that are written but not read by the processor in question are cacheable only in a cache level shared by the processors 102 (e.g., Level 3 (L3) cache 108, shared cache 108).

In embodiments, by restricting truly shared memory to shared (L3) cache 108 (as described above), the system 100, at least for the producing processor, promotes elimination of cache ping-ponging (i.e., cache thrashing where a cache line rapidly vacillates back and forth between processor caches where each movement between caches requires the overhead of additional cache coherence transactions), and thus, promotes improved system efficiency and reduced overhead. Further, the above-referenced attributes of the system 100 promote scalability and promote the ability of the processors 102 to exchange information with each other and with hardware accelerators in a manner which requires very low processor and cache subsystem overhead. In embodiments, the system 100 utilizes operating system/device driver software or the equivalent to set the proper cache attributes for memory management unit (MMU) pages that are allocable to the shared cache 108 or the local caches 106. In some embodiments, the system 100 implements core clusters 102 of four ARM CPUs, where the clusters 102 share the L3 cache 108, processor(s) within a respective cluster 102 share that cluster's L2 cache, inner cache attributes determine cacheability in the L1/L2 cache, outer cache attributes determine cacheability in the L3 cache.

Figure 2:
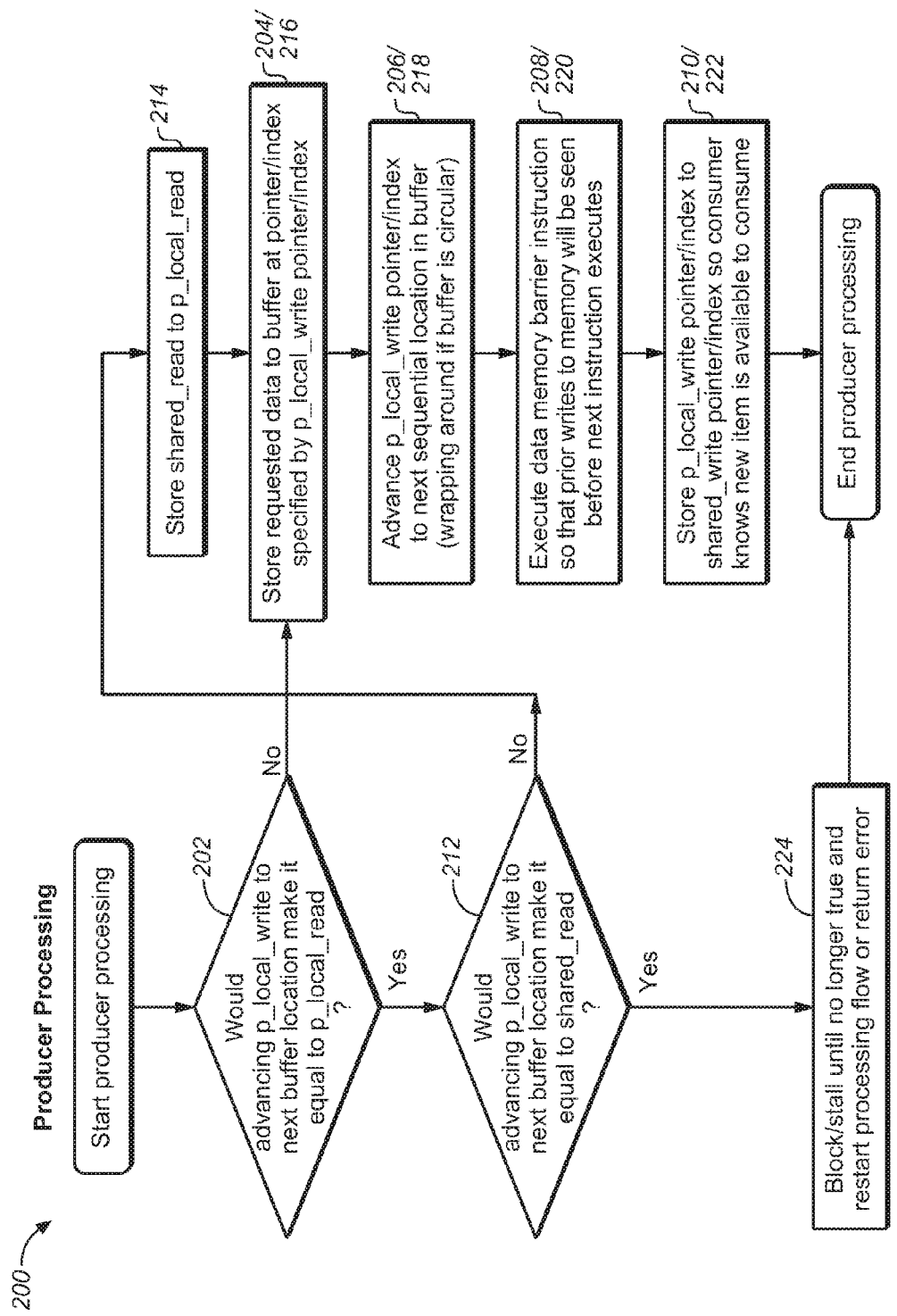
FIG. 2 is a flow chart illustrating a method of operation of a producer processor of the system shown in FIG. 1 in accordance with an exemplary embodiment of the present disclosure.

FIG. 2 is a flowchart illustrating a method of operation of the system 100 described above. In embodiments, the method 200 includes a step of a first processor (e.g., producing/producer processor) of the system processing data (e.g., beginning processing) including determining if advancing a first variable (e.g., p_local_write) of a buffer from a first location in the buffer to a second location in the buffer would make the first variable equal to a second variable (e.g., p_local_read), the first variable and the second variable being processor local variables (Step 202). In embodiments, when the system determines that advancing the first variable of the buffer from the first location to the second location would not make the first variable equal to the second variable, the method 200 further includes: storing requested data to the buffer at a pointer/index specified by the first variable (e.g., p_local_write pointer/index) (Step 204); advancing the first variable (e.g., p_local_write pointer/index) to the second location (e.g., the next sequential location) in the buffer (e.g., wrapping around if the buffer is circular) (Step 206); executing a data memory barrier instruction for allowing prior writes to memory to be seen before a next instruction executes (Step 208); and storing the first variable (e.g., p_local_write pointer/index) to shared cache (e.g., shared_write pointer/index) so that a second processor (e.g., consuming/consumer processor) of the system is alerted that a new item (e.g., the first variable) is available for consumption by the second processor (Step 210).

In embodiments, when the system 100 determines that advancing the first variable of the buffer from the first location to the second location would make the first variable equal to the second variable, the method 200 further includes the step of determining if advancing the first variable (e.g., p_local_write) of the buffer from the first location to the second location would make the first variable equal to a shared variable (e.g., shared_read) (Step 212). In embodiments, when the system 100 determines that advancing the first variable (e.g., p_local_write) of the buffer from the first location to the second location would not make the first variable equal to the shared variable (e.g., shared_read), the method 200 further includes: storing the shared variable (e.g., shared_read) to the second variable (e.g., p_local_read) (Step 214); storing requested data to the buffer at a pointer/index specified by the first variable (e.g., p_local_write pointer/index) (Step 216); advancing the first variable (e.g., p_local_write pointer/index) to the second location (e.g., the next sequential location) in the buffer (e.g., wrapping around if the buffer is circular) (Step 218); executing a data memory barrier instruction for allowing prior writes to memory to be seen before a next instruction executes (Step 220); and storing the first variable (e.g., p_local_write pointer/index) to shared cache (e.g., shared_write pointer/index) so that a second processor (e.g., consuming/consumer processor) of the system is alerted that a new item (e.g., the first variable) is available for consumption by the second processor (Step 222). In embodiments, when the system 100 determines that advancing the first variable (e.g., p_local_write) of the buffer from the first location to the second location would make the first variable equal to the shared variable (e.g., shared_read), the method 200 further includes stalling processing by the first processor until a time when advancing the first variable (e.g., p_local_write) of the buffer from the first location to the second location would not make the first variable equal to the shared variable (e.g., shared_read) or optionally, returning a queue full error (Step 224).

Figure 3:
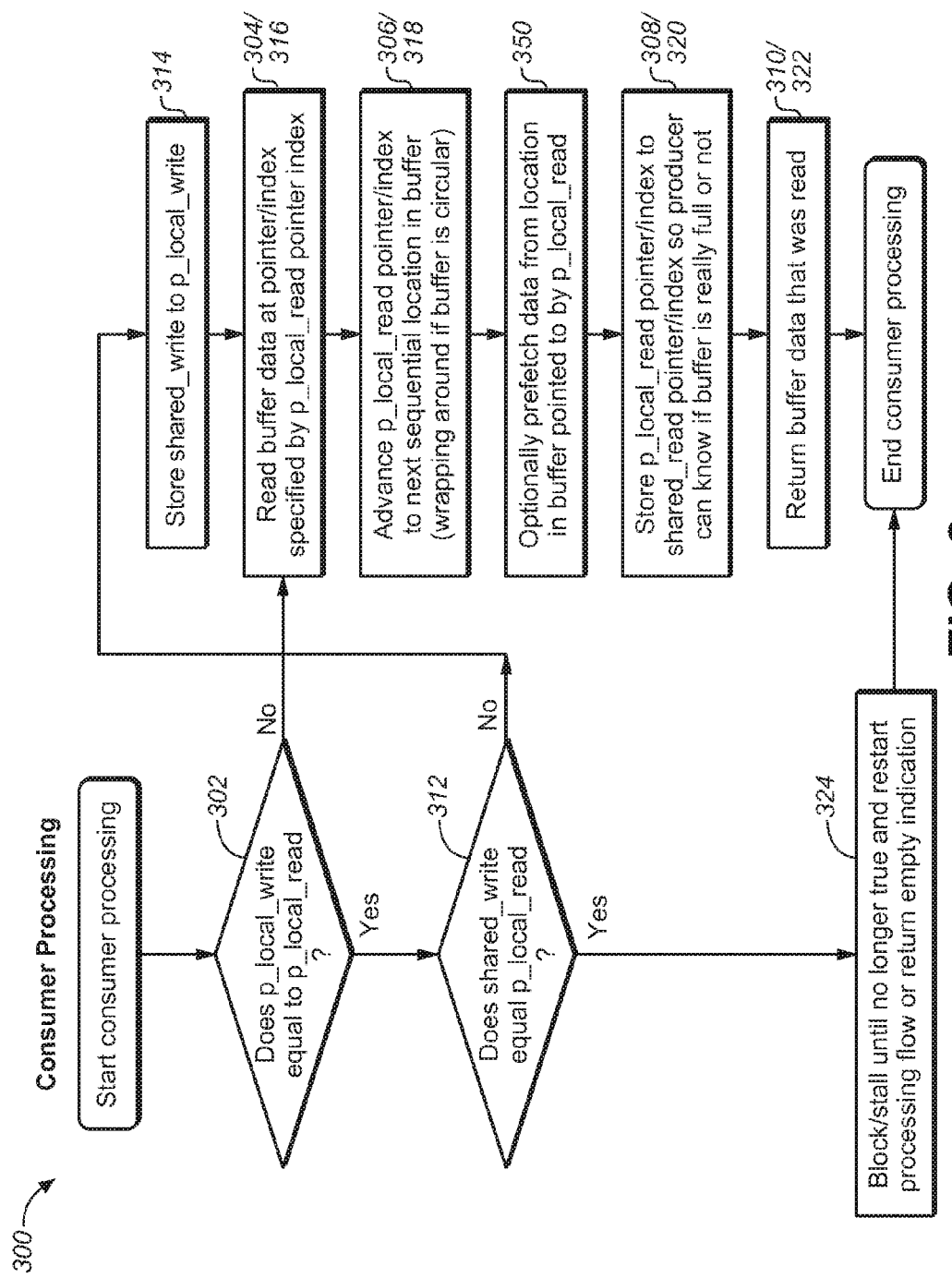
FIG. 3 is a flow chart illustrating a method of operation of a consumer processor of the system shown in FIG. 1 in accordance with an exemplary embodiment of the present disclosure

FIG. 3 is a flowchart illustrating a method of operation of the system 100 described above. In embodiments, the method 300 includes a step of processing data (e.g., beginning processing) including determining via a first processor (e.g., consumer processor) of the system if a first variable (e.g., p_local_write) is equal to a second variable (e.g., p_local_read), the first and second variables being processor local variables (Step 302). In embodiments, when the first variable (e.g., p_local_write) is determined as not being equal to the second variable (p_local_read), the method 300 includes: reading buffer data at a pointer/index specified by the second variable (e.g., p_local_read pointer/index) (Step 304); advancing the second variable (e.g., p_local_read pointer/index) to a next sequential location in a buffer (e.g., wrapping around if buffer is circular) (Step 306); storing the second variable (e.g., p_local_read pointer/index) to the shared cache (e.g., shared_read pointer/index) so that a second processor (e.g., producer processor) can determine if the buffer is full or not (Step 308); and returning buffer data that was read (Step 310).

In embodiments, when the first variable (e.g., p_local_write) is determined as being equal to the second variable (e.g., p_local_read), the method 300 includes a step of determining if the second variable (e.g., p_local_read) is equal to a shared variable (e.g., shared_write) (Step 312). In embodiments, when the second variable is determined as not being equal to the shared variable, the method 300 includes: storing the shared variable to the first variable (Step 314); reading buffer data at a pointer/index specified by the second variable (e.g., p_local_read pointer/index) (Step 316); advancing the second variable (e.g., p_local_read pointer/index) to a next sequential location in a buffer (e.g., wrapping around if buffer is circular) (Step 318); storing the second variable (e.g., p_local_read pointer/index) to the shared cache (e.g., shared_read pointer/index) so that a second processor (e.g., producer processor) can determine if the buffer is full or not (Step 320); and returning buffer data that was read (Step 322). In embodiments, when the second variable (e.g., p_local_read) is determined as being equal to the shared variable (e.g., shared_write), the method 300 includes stalling processing by the consumer processor until a time when the second variable (p_local_read) is not equal to the shared variable (e.g., shared_write) (Step 324).

In some embodiments, after advancing the second variable (e.g., p_local_read pointer/index) to a next sequential location in a buffer (Steps 306 and 318), but prior to storing the second variable (e.g., p_local_read pointer/index) to the shared cache (e.g., shared_read pointer/index) so that a second processor (e.g., producer processor) can determine if the buffer is full or not (Steps 308, 320), the method 300 includes a step of prefetching data from a buffer location pointed to by the second variable (Step 350).

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operation of a multiprocessor system, the method comprising:
   determining via a first processor of the system if advancing a first variable of a buffer from a first location in the buffer to a second location in the buffer would make the first variable equal to a second variable, the first variable and the second variable being processor local variables;
   when determining indicates that advancing the first variable from the first location to the second location would not make the first variable equal to the second variable, performing steps of:
      storing requested data to the buffer at a pointer specified by the first variable; and
      advancing the first variable to the second location in the buffer; and
   when determining indicates that advancing the first variable from the first location to the second location would make the first variable equal to the second variable, performing steps of:

determining whether advancing the first variable from the first location to the second location would make the first variable equal to a shared variable; and storing the shared variable to the second variable when advancing the first variable from the first location to the second location would not make the first variable equal to the shared variable.

2. The method as claimed in claim 1, wherein the first processor is a producer processor and a second processor is a consumer processor having access to the buffer concurrent with the producer processor, wherein the first variable includes a memory pointer or an index and the second variable includes a memory pointer or an index.

3. The method as claimed in claim 1, further comprising:
when determining indicates that advancing the first variable from the first location to the second location would not make the first variable equal to the second variable, further performing a step of:
executing a data memory barrier instruction for allowing prior writes to memory of the system to be detected before a next instruction executes; and
storing the first variable to shared cache of the system to provide an indication to a second processor of the system that the first variable is available for consumption by the second processor, shared cache being shared by the first processor and the second processor.

4. The method as claimed in claim 1, further comprising:
associating the memory pointer or the index for the first variable with a local buffer, associating the memory pointer or the index for the second variable with the local buffer, and associating a memory pointer or an index of the shared variables with a shared buffer.

5. The method as claimed in claim 2, further comprising:
managing memory access such that variables written and not read by at least one of the first processor and the second processor are cacheable only in shared cache.

6. The method as claimed in claim 1, further comprising:
when determining indicates that advancing the first variable from the first location to the second location would not make the first variable equal to the shared variable, further performing a step of:
storing requested data to the buffer at a pointer specified by the first variable.

7. The method as claimed in claim 6, further comprising:
when determining indicates that advancing the first variable from the first location to the second location would not make the first variable equal to the shared variable, further performing a step of:
advancing the first variable to the second location in the buffer.

8. The method as claimed in claim 7, further comprising:
when determining indicates that advancing the first variable from the first location to the second location would not make the first variable equal to the shared variable, further performing a step of:
executing a data memory barrier instruction.

9. The method as claimed in claim 8, wherein the buffer is a first buffer and further comprising:
when determining indicates that advancing the first variable from the first location to the second location would not make the first variable equal to the shared variable, further performing a step of:
storing the first variable to shared cache of the system to provide an indication in a second buffer, the indication in the second buffer indicating to a second processor of the system that the first variable is available for consumption by the second processor.

10. The method as claimed in claim 1, further comprising:
when determining indicates that advancing the first variable from the first location to the second location would make the first variable equal to the shared variable, further performing a step of:
stalling processing by the first processor until a time when advancing the first variable of the buffer from the first location to the second location would not make the first variable equal to the shared variable.

11. The method as claimed in claim 1, wherein the shared variable is cacheable only in shared cache of the system, shared cache being shared by the first processor and a second processor of the system.

12. The method as claimed in claim 1, wherein the processor local variables are not shared between the first processor and a second processor of the system.

13. A non-transitory computer-readable medium having computer-executable instructions for performing a method of operation of a multiprocessor system, the method comprising:
determining via a first processor of the system if advancing a first variable of a buffer from a first location in the buffer to a second location in the buffer would make the first variable equal to a second variable, the first variable and the second variable being processor local variables;
when determining indicates that advancing the first variable from the first location to the second location would not make the first variable equal to the second variable, performing steps of:
storing requested data to the buffer at a pointer specified by the first variable;
advancing the first variable to the second location in the buffer; and
executing a data memory barrier instruction for allowing prior writes to memory of the system to be detected before a next instruction executes; and
when determining indicates that advancing the first variable from the first location to the second location would make the first variable equal to the second variable, performing steps of:
determining whether advancing the first variable from the first location to the second location would make the first variable equal to a shared variable; and
storing the shared variable to the second variable when advancing the first variable from the first location to the second location would not make the first variable equal to the shared variable.

14. The non-transitory computer-readable medium as claimed in claim 13, the method further comprising:
when determining indicates that advancing the first variable from the first location to the second location would not make the first variable equal to the second variable, further performing a step of:
storing the first variable to shared cache of the system to provide an indication to a second processor of the system that the first variable is available for consumption by the second processor, shared cache being shared by the first processor and the second processor.

15. The non-transitory computer-readable medium as claimed in claim 14, wherein the pointer is a first pointer associated with local cache, and wherein storing the first variable to the shared cache of the system includes storing the first pointer specified by the first variable to a second pointer associated with the shared cache.

16. The non-transitory computer-readable medium as claimed in claim 13, the method further comprising:
  when determining indicates that advancing the first variable from the first location to the second location would not make the first variable equal to the shared variable, further performing steps of:
  storing requested data to the buffer at a pointer specified by the first variable;
  advancing the first variable to the second location in the buffer;
  executing a data memory barrier instruction for allowing prior writes to memory of the system to be detected before a next instruction executes; and
  storing the first variable to shared cache of the system to provide an indication to a second processor of the system that the first variable is available for consumption by the second processor.

17. The non-transitory computer-readable medium as claimed in claim 13, the method further comprising:
  when determining indicates that advancing the first variable from the first location to the second location would make the first variable equal to the shared variable, further performing a step of:
  stalling processing by the first processor until a time when advancing the first variable of the buffer from the first location to the second location would not make the first variable equal to the shared variable.

18. The non-transitory computer-readable medium as claimed in claim 13, wherein the shared variable is cacheable only in shared cache of the system, shared cache being shared by the first processor and a second processor of the system.

19. The non-transitory computer-readable medium as claimed in claim 13, wherein the processor local variables are not shared between the first processor and a second processor of the system.

20. A multiprocessor system, comprising:
  a first processor, the first processor including local cache accessible only by the first processor;
  a second processor communicatively couple with the first processor, the second processor including local cache accessible only by the second processor;
  a memory, the memory being communicatively coupled with the first processor and the second processor;
  a shared cache, the shared cache configured for being accessible by the first processor and the second processor,
  wherein the system is a distributed processing system and is configured for allocating a first copy of a single producer single consumer queue and a copy of shared variables to the shared cache and at least a second copy of the single producer single consumer queue and a copy of local variables respectively to the first local cache and the second local cache when the memory is first accessed by the processors, the shared variables being control variables used by the processors to signal each other that data is available in the first copy of the single producer single consumer queue and being cacheable only in the shared cache, and the local variables being control variables used by the processors to respectively point to a location in the at least the second copy of the single producer single consumer queue and are cacheable only in the respective local cache; and
  wherein the system is further configured for determining via at least one of the first processor or the second processor of the system if a first variable of a buffer is equal to a second variable of the buffer, the first variable and the second variable being processor local control variables;
    when determining indicates that the first variable is not equal to the second variable, performing steps of:
      reading requested data from the buffer at a pointer specified by the second variable; and
      advancing the second variable to a second location in the buffer; and
    when determining indicates that the first variable would be equal to the second variable, performing steps of:
      determining whether the second variable would be equal to a shared variable; and
      storing the shared variable to the first variable when the second variable would not be equal to the shared variable.

\* \* \* \* \*